United States Patent [19]

Keesen

[11] Patent Number: 5,519,504

[45] Date of Patent: May 21, 1996

[54] METHOD OF STORING OR REPRODUCING DATA PACKETS

[75] Inventor: Heinz-Werner Keesen, Hanover, Germany

[73] Assignee: Deutsche Thomson-Brandt GmbH, Germany

[21] Appl. No.: 209,954

[22] Filed: Mar. 10, 1994

[51] Int. Cl.[6] .......................... H04N 5/919; H04N 5/926
[52] U.S. Cl. ..................... 358/335; 348/423; 360/39; 360/48
[58] Field of Search ..................... 358/335, 339; 360/39, 48; 348/423; H04N 5/919, 5/926

[56] References Cited

U.S. PATENT DOCUMENTS

| | | | |
|---|---|---|---|
| 5,047,852 | 9/1991 | Hanyu | 358/339 |
| 5,309,292 | 5/1994 | Takakura | 348/409 |
| 5,412,514 | 5/1995 | Kobayashi | 358/335 |

*Primary Examiner*—Howard W. Britton
*Attorney, Agent, or Firm*—Joseph S. Tripoli; Joseph J. Laks; Daniel E. Sragow

[57] ABSTRACT

Customary recorders record data packets of which the format is adapted to the data format of the recorder. If, however, the data packets have a differing format, various difficulties arise, for example, with error protection. In such cases, therefore, there is also no provision for a search mode with an at least partial evaluation of data packets.

According to the invention, before the recording/storage, the data packets are consequently arranged "transversely" in accordance with FIG. 1, i.e. it is not so that each data packet (1, 2, 3, 4, 5) is progressively recorded/stored (in the vertical direction in FIG. 1), but that the first section (a) of the data packets is progressively recorded (in the horizontal direction in FIG. 1). Subsequently, the further sections of these data packets are recorded. In the fast search of a digital recorder, the helical tracks can, however, only be read section by section. Of the data packets (1 . . . 5), there would only be picked up rudiments, which cannot be meaningfully decoded for reproduction. Thus, additional data packets (A1, A2, B1, B2), which may also partially be copies of the data already recorded in the "normal" way, are recorded in reserve sections which can be contiguously read in a search. In a search at increased speed, these reserve sync blocks are then evaluated.

7 Claims, 2 Drawing Sheets

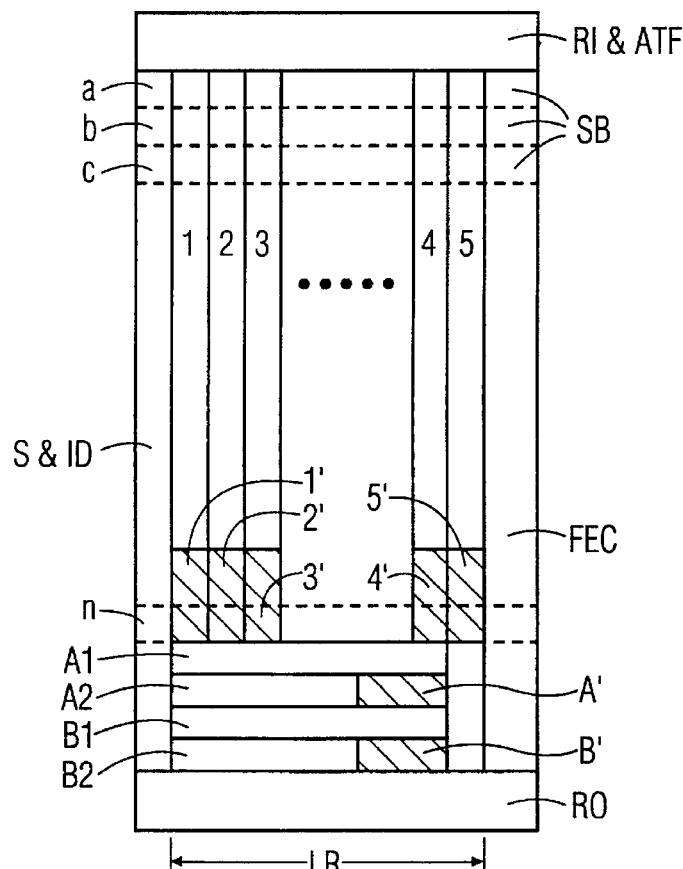
FIG. 1
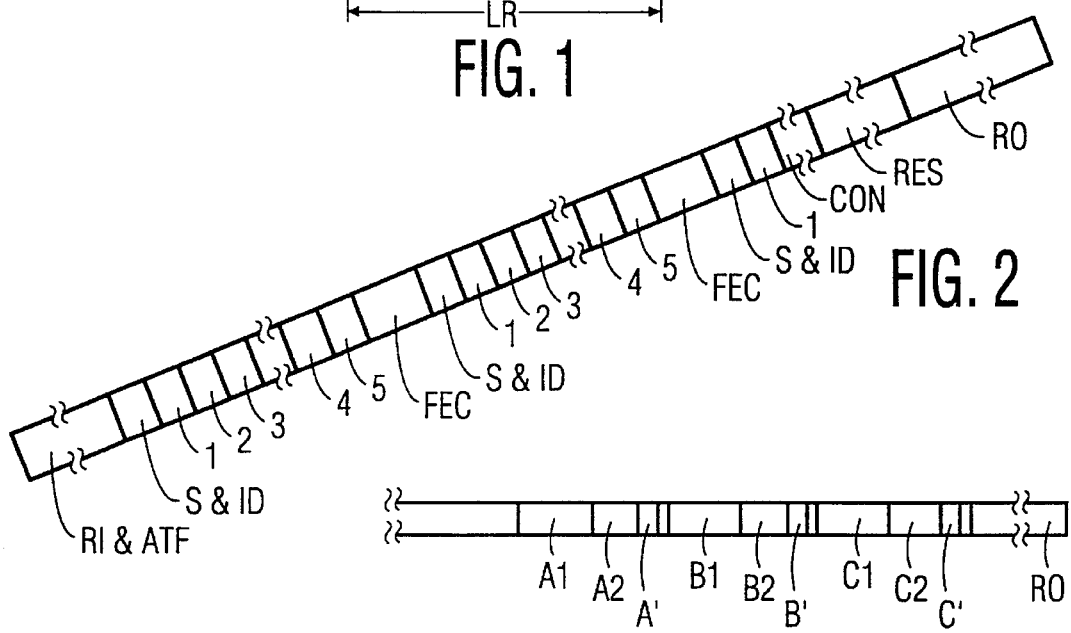
FIG. 2
FIG. 3
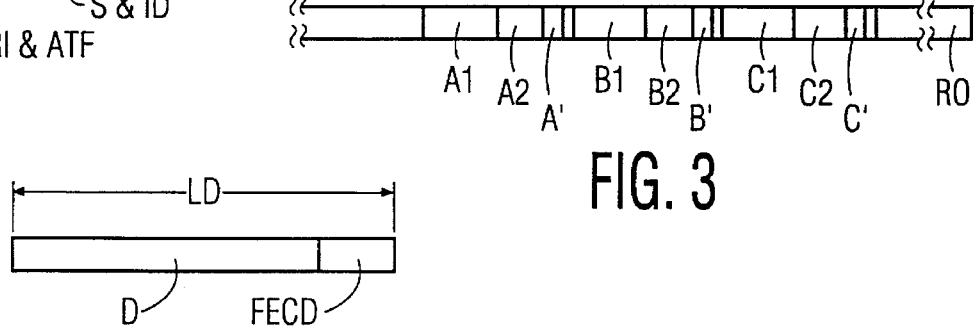
FIG. 4

METHOD OF STORING OR REPRODUCING DATA PACKETS

The present invention relates to a method of storing or reproducing data packets, in particular in the case of a digital video or data recorder.

Prior Art

Customary recorders, for example, DCC recorders for the magnetic recording of digital audio data, record data packets of which the data format is adapted to the data format of the recorder. If, however, the data packets have a differing format, various difficulties arise, for example, with error protection. In such cases, therefore, there is also no provision for a search mode with an at least partial evaluation of data packets.

Invention

The invention is based on the object of specifying a method of recording/reproducing data packets of which the data format does not coincide with the data format of the recording or reproducing apparatus.

Customarily, in video or data recorders the data packets are recorded/stored or read progressively in the track direction. In order to eliminate or mitigate the effect of errors, the recording apparatus additionally records an error protection FEC (FIG. 1). In addition, the data may be scrambled in a way which is as irregular as possible, in order to restrict the influence of tape errors.

During the course of the introduction of digital broadcast systems, in future it will be necessary, however, to receive data packets (FIG. 4) of differing data formats and of the respective length LD, which have in addition to their user data D also an independent error protection FECD. Thus, if such data packets are to be recorded of a digital recorder, the length LD and the error protection FECD of the data packets normally do not match the packet length LR and the error protection FEC of the recorder or of the storage device.

According to the invention, before the recording/storage, the data packets are consequently arranged "transversely" in accordance with FIG. 1, i.e. it is not so that each data packet 1, 2, 3, 4, 5 is progressively recorded/stored (in the vertical direction in FIG. 1), but that the first section a of the data packets of a group 1 . . . 5 of data packets is progressively recorded (in the horizontal direction in FIG. 1). Subsequently, the second section b of these data packets is respectively recorded, then the third section c, etc. Before and/or after the group of first sections, there may be arranged, for example, sync and/or ident information S&ID. Before and/or after the group of first sections, the internal error protection FEC of the recording/storage apparatus is arranged. One group of these sections in each case forms with the associated sync and/or ident information and the error protection FEC a sync block SB.

The sections with the data packet's own error protection 1', 2', 3', 4', 5' are recorded/stored contiguously in corresponding sync blocks before and/or after the sync blocks with the user data D. As a result, a two-dimensional error correction or determination is possible. Both the error protection FEC of the recording/storage apparatus and the error protection FECD of the data packets 1 . . . 5 can be optimally utilized.

In the fast search of a digital recorder, the helical tracks can, however, only be read section by section. Of the data packets 1 . . . 5 arranged transversely as shown in FIG. 1, there would only be picked up rudiments, which cannot be meaningfully decoded for reproduction. It has been found that in the case of recording in a digital recorder there are capacity reserves, for example, due to not fully utilized tape areas or the possibility of low-frequency recording.

According to the invention, data packets with or without their own error protection are additionally recorded in such reserve sections which can be contiguously read in a search. The associated user data are normally partially copies of the data already recorded in the "normal" way. In a search at increased speed, these reserve sync blocks—or at least some of them - are then evaluated.

In principle, the method according to the invention of storing or reproducing data packets—in particular in the case of a digital video or data recorder—has the following features:

the length of the data packets to be stored is greater than the length available for a sequential storage/reproduction of data packets;

in each case there is formed a group of data packets to be stored, within which corresponding small sections of the individual data packets are respectively stored/read sequentially, beginning with the first section for each data packet, so that the sections of each individual one of the data packets appear at uniform intervals in the data stream;

associated with each corresponding group of identically positioned sections there is an error protection assigned to the storage/reproduction;

the sections with an error protection associated with the data packets are recorded/reproduced without insertion of user data of the data packets.

Advantageous further developments of the method according to the invention, in particular the possibility of the search mode, emerge from the associated dependent claims.

DRAWINGS

Exemplary embodiments of the invention are described with reference to the drawings, in which:

FIG. 1 shows an arrangement of the data to be recorded in two-dimensional representation;

FIG. 2 shows a sequence of the data in a helical track;

FIG. 3 shows a sequence of the additional search data in the helical track;

FIG. 4 shows a data packet to be recorded, with associated source error protection.

EXEMPLARY EMBODIMENTS

Figure 5:
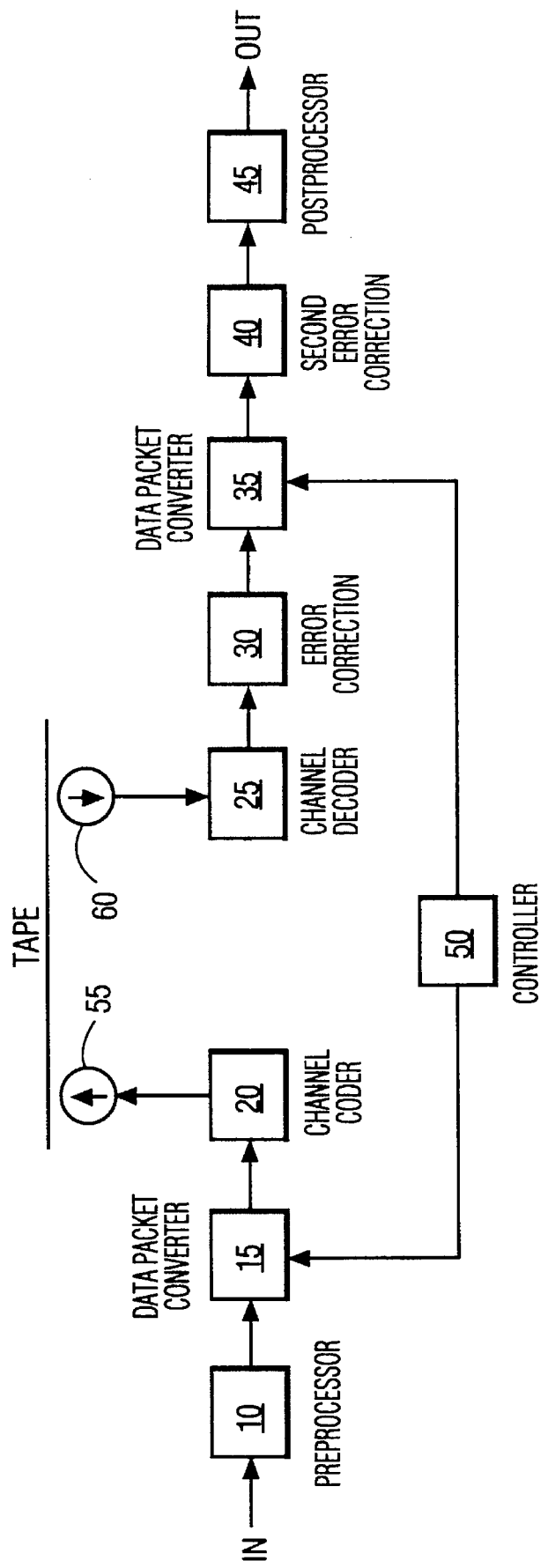
FIG. 5 shows an apparatus for practicing the method of the invention.

The data in the representation according to FIG. 1 are stored or read line by line (horizontally). The actual arrangement of these data in a helical track of a digital recorder is shown by FIG. 2.

The helical track begins with run-in and ATF data (automatic track following) RI&ATF for controlling a servo. There follow the data belonging to the sync block a:

sync and ID information S&ID The sync information allows the detection of the beginning of the sync block on the basis of a specific data word. The ID information contains, for example, the consecutive number of the sync block SB.

first section of the first data packet 1 (corresponding to FIG. 4)

first section of the second data packet 2

•

•

• first section of the last data packet 5 in this helical track. These sections may, for example, in each case comprise one byte.

recorder-own error protection FEC

This error protection is, for example, a forward error correction with a Reed-Solomon code.

There then follow the corresponding data of the sync blocks b, c, . . . In helical track there are arranged, for example, 200 such sync blocks with, for example, 90 bytes in each case.

There then follow sync blocks which contain the data packet's own error protection 1', 2', . . . , 5', associated with the data packets 1 . . . 5, and which are arranged in FIG. 2 in the region CON.

There may follow on a region RES, which contains the above-mentioned capacity reserves. At the end of the helical track there then follow run-out data RO.

By the special arrangement of the data packets according to FIG. 4 within the recorder data format, the data sections associated with a data packet appear at regular intervals on the helical track. Only relatively simple hardware is required for dividing up the data packets or putting them together again. The data packets have, for example, a length LD of 148 bytes. Double, two-dimensional error protection by FEC and FECD, which can respectively be optimally used, is also advantageous. For example, the location of an error can be determined by FEC and this error can then be corrected by FECD.

For a search mode, the search data packets are arranged, for example, in the region RES in FIG. 2 or in FIG. 1 between the run-in and ATF data RI&ATF, the sync and ID information S&ID, the recorder-own error protection FEC and the run-out data RO, to be precise next to the data packets 1 . . . 5 with their error protection 1'. . . 5' or else as low-frequency modulation under these data packets.

The region RES from FIG. 2 is represented in more detail in FIG. 3 and contains the components A1, A2, A', B1, B2, B', C1, C2, C'of the search data packets, A', B' and C' representing the associated, packet-own error protection.

Depending on the search speed (for example, up to a factor of 20), for example, up to six such additional data packets can be picked up and evaluated.

In the transmission of a digital TV/HDTV television signal, for example, the entire picture information can be divided up into HP information (high priority) and SP information (standard priority), the HP information corresponding to a bandwidth of 4 MHz.

The HP information then contains the coded data for television pictures with TV resolution. The SP information then contains coded additional data for the formation of television pictures with HDTV resolution.

In the storage or reproduction according to the invention, the SP information and the HP information is then contained in the data packets 1 . . . 5. The HP information is (partially) also contained in the data packets A1, A2, . . . , C1, C2. In the search of recorded HDTV signals, television pictures can then be reproduced in TV resolution.

FIG. 5 shows an apparatus which may be used to practice the invention, comprising:

a preprocessor (10) which may contain a Y/C separator, A/D converter, and additional error protection generator for the data packets;

a data packet converter (15) for re-ordering the data packets according to FIG. 1, e.g. RAM stores;

a channel coder (20)including run-in and ATF (automatic track following) data generator, sync and ID data generator, and channel error protection generator;

recording head (55) for writing on tape;

replay head (60) for reading the tape;

channel decoder (25) including sync and clock re-generator and ID evaluator;

error correction circuit (30) for correcting channel errors using the error protection data from the channel coder;

optionally, an inverse data packet converter (35) having the inverse function of the data packet converter (15);

a second error correction circuit (40) for correcting channel errors using the error protection data from the preprocessor (10);

optionally, a postprocessor (45) which may contain Y/C or RGB circuits and a D/A converter circuit; and a controller (50) which provides the data packet converters with address and control data.

The invention may be used in magnetic or optical recording/storage/reproduction for video, audio and/or other data.

What is claimed is:

1. Method of storing and reading data packets representative of digital data, wherein the length of the data packets is greater that the space available for sequential storage of said data packets, said method comprising:

a) forming a group of sections at uniform intervals in which said data packets are to be stored, b) storing the first part of each data packet at the beginning of each section, so that each said first part appears at uniform intervals in the data stream, c) storing an error protection code in each group of sections in an area not having said digital data, and d) sequentially reading each of said group of sections.

2. Method according to claim 1, characterized in that both the error protection assigned to the storage/production and the error protection associated with the data packets are utilized.

3. Method according to claim 1, characterized in that in each case a group (a, b, c, . . . , n) of data packets (1, 2, 3, 4, 5) to be stored and, if available, the associated data packets (A1, A2; B1, B2) which can be read in a search are arranged in a helical track of a recorder.

4. Method according to claim 1, comprising the step of storing search readable data packets at sequential regular intervals.

5. Method according to claim 4, characterized in that the data packets which can be read in the search are copies of individual ones of the other data packets.

6. Method according to claim 4, characterized in that the data packets (A1, A2; B1, B2) which can be read in the search are arranged, with respect to a two-dimensional representation (FIG. 1), next to the other data packets (1 . . . 5) with their error protection (1' . . . 5') or as low-frequency modulation under these data packets.

7. Method according to claim 4, characterized in that in the data packets (A1, A2; B1, B2) which can be read in the search there is contained a code for television pictures in TV resolution and in the other data packets (1, 2, 3, 4, 5) there is contained essentially a code for television pictures in HDTV resolution.

* * * * *